United States Patent
Mellet et al.

(10) Patent No.: US 9,777,814 B2
(45) Date of Patent: Oct. 3, 2017

(54) THREE MODE CONTINUOUSLY VARIABLE TRANSMISSION

(71) Applicant: GM Global Technology Operations LLC, Detroit, MI (US)

(72) Inventors: Edward W. Mellet, Rochester Hills, MI (US); Craig S. Ross, Ypsilanti, MI (US); Chunhao J. Lee, Troy, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 14/261,053

(22) Filed: Apr. 24, 2014

(65) Prior Publication Data

US 2015/0308551 A1   Oct. 29, 2015

(51) Int. Cl.
*F16H 3/66* (2006.01)
*F16H 37/02* (2006.01)
*F16H 3/44* (2006.01)

(52) U.S. Cl.
CPC ............. *F16H 37/022* (2013.01); *F16H 3/66* (2013.01); *F16H 3/663* (2013.01); *F16H 3/666* (2013.01); *F16H 2003/442* (2013.01); *F16H 2037/023* (2013.01); *F16H 2037/026* (2013.01); *F16H 2200/2005* (2013.01); *F16H 2200/2007* (2013.01); *F16H 2200/2023* (2013.01); *F16H 2200/2041* (2013.01)

(58) Field of Classification Search
None
See application file for complete search history.

(56) References Cited

U.S. PATENT DOCUMENTS

| 4,070,927 A | * | 1/1978 | Polak | F16H 3/66 475/275 |
| 5,106,352 A | * | 4/1992 | Lepelletier | F16H 3/66 475/280 |
| 5,890,987 A | * | 4/1999 | Lamers | F16H 37/022 474/28 |
| 6,855,085 B1 | * | 2/2005 | Gumpoltsberger | F16H 37/021 475/211 |
| 7,238,141 B2 | * | 7/2007 | Shim | F16H 3/66 475/276 |
| 8,579,753 B2 | | 11/2013 | Heitzenrater et al. | |

(Continued)

FOREIGN PATENT DOCUMENTS

EP  0787927 A2  6/1997
KR  1020120055978 A  6/2012

OTHER PUBLICATIONS

Pending U.S. Appl. No. 14/031,636, filed Sep. 19, 2013, by Edward W. Mellet. All pages.

(Continued)

*Primary Examiner* — Robert A Siconolfi
*Assistant Examiner* — Ryan Dodd

(57) ABSTRACT

A three mode continuously variable transmission (CVT) for a motor vehicle includes an optional speed change device connected to a pulley and a belt assembly or other continuously variable unit. The pulley and belt assembly is also connected to a planetary gear set arrangement. The planetary gear set arrangement generally includes two planetary gear sets, two brakes and two clutches. The planetary gear set arrangement is connected to a final drive unit. Engagement of the clutches and brakes provides three modes of operation to the CVT.

7 Claims, 4 Drawing Sheets

(56) References Cited

U.S. PATENT DOCUMENTS

| | | |
|---|---|---|
| 2007/0054772 A1 | 3/2007 | Shim |
| 2010/0075799 A1* | 3/2010 | Suzuki ............... F16H 61/0437 477/44 |
| 2012/0214632 A1 | 8/2012 | Mellet et al. |
| 2013/0130859 A1 | 5/2013 | Lundberg et al. |
| 2013/0324355 A1 | 12/2013 | Xie et al. |
| 2013/0333508 A1 | 12/2013 | Lundberg et al. |
| 2014/0038761 A1 | 2/2014 | Xu |

OTHER PUBLICATIONS

Pending U.S. Appl. No. 14/247,867, filed Apr. 8, 2014, by John C. Schultz. All pages.

Pending U.S. Appl. No. 14/257,573, filed Apr. 21, 2014, by Tejinder Singh. All pages.

Pending U.S. Appl. No. 61/942,426, filed Feb. 20, 2014, by Pete R. Garcia. All pages.

* cited by examiner

| GEAR STATE | GEAR RATIO | RATIO STEP | TORQUE TRANSMITTING MECHANISMS | | | | | VAR3 |
|---|---|---|---|---|---|---|---|---|
| | | | 58 | 60 | 54 | 56 | | |
| REV | -19.777 | | | X | X | | | 2.2 |
| N | | -1.41 | | | | | | |
| 1st | 14.071 | | | X | | X | | 2.2 |
| 2nd | 9.594 | 1.47 | | X | | X | | 1.5 |
| 3rd | 6.716 | 1.43 | | X | | X | | 1.05 |
| 4th | 4.477 | 1.50 | | X | | X | | 0.7 |
| 5th | 2.940 | 1.52 | X | | | X | | 1.05 |
| 6th | 4.200 | 0.70 | X | | | X | | 1.5 |
| 7th | 2.940 | 1.43 | X | | | X | | 1.05 |
| 8th | 1.960 | 1.50 | X | | | X | | 0.7 |
| 9th | 2.100 | 0.93 | | | X | X | | 1.05 |
| 10th | 3.000 | 0.70 | | | X | X | | 1.5 |
| 11th | 2.100 | 1.43 | | | X | X | | 1.05 |
| 12th | 1.400 | 1.50 | | | X | X | | 0.7 |
| OVERALL RATIO | | 10.05 | | | | | | |

*Fig-7*

THREE MODE CONTINUOUSLY VARIABLE TRANSMISSION

FIELD

The present disclosure relates to automatic transmissions and more particularly to a three mode continuously variable transmission for a front or rear wheel drive motor vehicle.

BACKGROUND

The statements in this section merely provide background information related to the present disclosure and may or may not constitute prior art.

A continuously variable transmission ("CVT") typically includes a belt and pulley system that operatively couples a rotary power source, such as an engine or electric motor, to a double gear final drive unit. The belt and pulley system generally includes first and second pairs of pulley cones having a torque transmitting belt or chain extending between the cone pairs. Each pulley cone pair includes an axially stationary pulley member and an axially movable pulley member. Each movable pulley member is axially adjustable with respect to the stationary pulley member by a hydraulic system. The hydraulic system provides primary and secondary hydraulic pressures to the respective movable pulley members to adjust the running radius of the first and second pulley cone pairs which in turn controls the output/input ratio of the continuously variable transmission. Movement of the cones steplessly or continuously varies the ratio of an input speed to an output speed. With the continuously variable transmission, small but effective ratio changes can be attained. This is in contrast to a fixed gear ratio unit where any ratio changes are step values.

While these CVT's are effective they are limited to an overall speed ratio of approximately 7. Higher overall speed ratios require larger pulleys which negatively affect the CVT mass, efficiency, and cost. Accordingly, there is a constant need for improved CVT designs that minimize axial length and mass while providing sufficient performance characteristics including an increased overall speed ratio.

SUMMARY

A three mode CVT is provided for a motor vehicle. The three mode CVT includes an optional speed change device connected to a pulley and a belt assembly. The pulley and belt assembly is also connected to a planetary gear set arrangement. The planetary gear set arrangement generally includes two planetary gear sets, two brakes and two clutches. The planetary gear set arrangement is connected to a final drive unit.

In one example, a continuously variable transmission includes an input member, an output member, a continuously variable unit interconnected with the input member, and a gearbox connected to the continuously variable unit and to the output member. The gearbox includes a first planetary gear set connected to a second planetary gear set by at least two fixed connections, two torque transmitting mechanisms connected between the continuously variable unit and the first and second planetary gear sets, and two torque transmitting mechanisms connected between the first and second planetary gear sets and a stationary member. Engagement of two of the four torque transmitting mechanisms provides three separate modes of operation to the continuously variable transmission.

In another example, the first planetary gear set includes a first member, a second member, and a third member and the second planetary gear set includes a first member, a second member, and a third member.

In yet another example, the second member of the first planetary gear set is directly connected to the third member of the second planetary gear set by one of the two fixed connections and the third member of the first planetary gear set is directly connected to the second member of the second planetary gear set by another of the two fixed connections.

In yet another example, the output member is directly connected to the third member of the first planetary gear set and to the second member of the second planetary gear set.

In yet another example, a first of the four torque transmitting mechanisms is a first clutch for selectively connecting the continuously variable unit with the first member of the first planetary gear set.

In yet another example, a second of the four torque transmitting mechanisms is a second clutch for selectively connecting the continuously variable unit with the first member of the second planetary gear set.

In yet another example, a third of the four torque transmitting mechanisms is a first brake for selectively connecting the first member of the first planetary gear set with the stationary member.

In yet another example, a fourth of the four torque transmitting mechanisms is a second brake for selectively connecting the second member of the first planetary gear set and the third member of the second planetary gear set with the stationary member.

In yet another example, the first members are sun gears, the second members are planet carriers, and the third members are ring gears.

In yet another example, the second member of the first planetary gear set is directly connected to the third member of the second planetary gear set by one of the two fixed connections and the first member of the first planetary gear set is directly connected to the first member of the second planetary gear set by another of the two fixed connections.

In yet another example, the output member is directly connected to the second member of the second planetary gear set.

In yet another example, a first of the four torque transmitting mechanisms is a first clutch for selectively connecting the continuously variable unit with the third member of the first planetary gear set.

In yet another example, a second of the four torque transmitting mechanisms is a second clutch for selectively connecting the continuously variable unit with the first member of the first planetary gear set and the first member of the second planetary gear set.

In yet another example, a third of the four torque transmitting mechanisms is a first brake for selectively connecting the third member of the first planetary gear set with the stationary member.

In yet another example, a fourth of the four torque transmitting mechanisms is a second brake for selectively connecting the second member of the first planetary gear set and the third member of the second planetary gear set with the stationary member.

In yet another example, the first planetary gear set is radially stacked with the second planetary gear set, and wherein the first planetary gear set includes a first member, the second planetary gear set includes a third member, and the first and second planetary gear sets share a common planet carrier member and a common member that functions as a ring gear for the first planetary gear set and a sun gear for the second planetary gear set.

In yet another example, a first of the four torque transmitting mechanisms is selectively engageable to connect the continuously variable unit with the first member of the first planetary gear set, the second of the four torque transmitting mechanisms is selectively engageable to connect the continuously variable unit with the common member, a third of the four torque transmitting mechanisms is selectively engageable to connect the first member of the first planetary gear set with the stationary member, and a fourth of the four torque transmitting mechanisms is selectively engageable to connect the third member of the second planetary gear set with the stationary member, and wherein the output member is connected to the common planet carrier member.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and is not intended to limit the scope of the present disclosure in any way.

FIG. 7 is a truth table presenting an example of a state of engagement of various torque transmitting elements to produce multiple forward and at least one reverse speed or gear ratios of the transmissions illustrated in FIGS. 1-6.

DETAILED DESCRIPTION

The following description is merely exemplary in nature and is not intended to limit the present disclosure, application, or uses.

Figure 1:
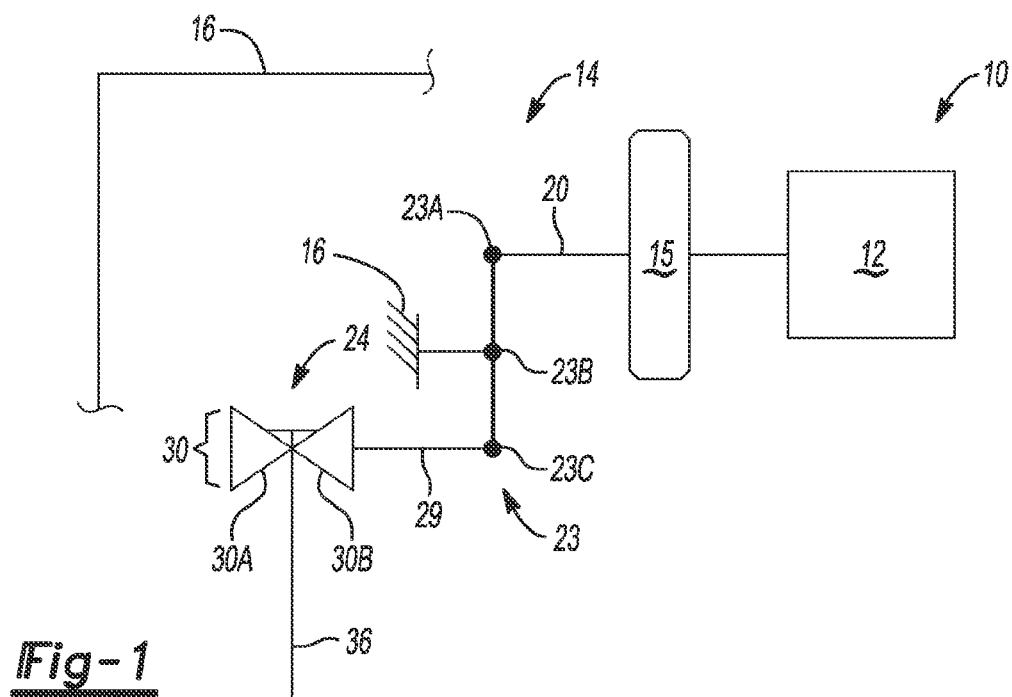
FIG. 1 is a schematic diagram of a powertrain according to the principles of the present invention.

With reference to FIG. 1, a powertrain for a motor vehicle is generally indicated by reference number 10. The powertrain 10 generally includes an engine 12 interconnected with a transmission 14. The engine 12 may be a conventional gasoline, Diesel, or flex fuel internal combustion engine, a hybrid engine, or an electric motor, or any other type of prime mover, without departing from the scope of the present disclosure. The engine 12 supplies a driving torque to the transmission 14 through, for example, a flexplate (not shown) or other connecting device or a starting device 15 such as a hydrodynamic device (torque converter) or launch clutch.

The transmission 14 is a variable diameter pulley or sheave drive continuously variable transmission (CVT). The transmission 14 includes a typically cast, metal housing 16 which encloses and protects the various components of the transmission 14. The housing 16 includes a variety of apertures, passageways, shoulders and flanges which position and support these components. Generally speaking, the transmission 14 includes a transmission input shaft 20 and a transmission output shaft 22. Connected between the transmission input shaft 20 and the transmission output shaft 22 is an optional speed change device 23, a pulley assembly or continuously variable unit 24, and a gearbox 26 that cooperate to provide forward and reverse speed or gear ratios between the transmission input shaft 20 and the transmission output shaft 22. The transmission input shaft 20 is functionally interconnected with the engine 12 through the starting device 15 and receives input torque or power from the engine 12. The transmission output shaft 22 is preferably connected with a final drive unit 28. The transmission output shaft 22 provides drive torque to the final drive unit 28. The final drive 28 unit may include a differential, axle shafts, and road wheels (not shown).

The transmission input shaft 20 is connected to the speed change device 23. In an alternate embodiment, the speed change device 23 is omitted from the transmission 14. The speed change device 23, as well as the various gearbox 26 arrangements described below, are illustrated in a lever diagram format. A lever diagram is a schematic representation of the components of a mechanical device such as meshing gear sets or planetary gear sets. Each individual lever represents a planetary gear set or meshed gear pair. The three basic mechanical components of the planetary gear are each represented by a node while the gear pairs are represented by a node and the rotation change represented by a node fixed to ground. Therefore, a single lever contains three nodes. In a planetary gear set, one node represents the sun gear, one the planet gear carrier, and one the ring gear. In a meshed gear pair, one node represents a first gear, one a second gear, and the third the rotational direction change between the meshed gears. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

For example, the speed change device 23 includes a first node 23A, a second node 23B, and a third node 23C. The first node 23A is coupled to the transmission input shaft 20. The second node 23B is fixed to ground representing a change in rotational direction. The third node 23C is coupled to a first transfer shaft or member 29 that is connected to the pulley assembly 24. The first node 23A preferably represents a first gear while the third node 23C preferably represents a second gear meshed with the first gear. The gears may be co-planar or partially axially offset. In one embodiment, the speed change device 23 is an overdrive speed change device 23 that increases the speed of the first transfer shaft 29 relative to the transmission input shaft 20 while decreasing the torque. In another embodiment, the speed change device 23 is an underdrive speed change device 23 that decreases the speed of the first transfer shaft 29 relative to the transmission input shaft 20 while increasing torque. In yet another embodiment, the speed change device 23 acts as a direct drive coupling member with no relative speed change. In yet another embodiment, the speed change device 23 is omitted from the transmission 14. In this embodiment, the first transfer shaft 29 and the transmission input shaft 20 are coupled directly together and coaxial to form a single transmission input shaft 20 that connects directly with the pulley assembly 24.

The pulley assembly 24 includes a first pulley or sheave pair 30 and a second pulley or sheave pair 32. The first pulley 30 includes a first truncated conical sheave or member 30A and second truncated conical sheave or member 30B in axial alignment with the first truncated conical sheave 30A. The second sheave 30B is directly connected for rotation with the first transfer member 29 and may be integrally formed with the first transfer member or shaft 29. The first sheave 30A is moveable axially relative to the second sheave 30B by a hydraulic control system (not shown) or other actuating system. It should be appreciated that the sheaves 30A and 30B may be axially switched without departing from the scope of the present invention.

The second pulley 32 includes a first truncated conical sheave or member 32A and second truncated conical sheave or member 32B in axial alignment with the first truncated conical sheave 32A. The second sheave 32B is directly connected for rotation with a second transfer shaft or member 34 or may be integrally formed with the second transfer shaft 34. The first sheave 32A is moveable axially relative to the second sheave 32B by a hydraulic control system (not shown) or other actuating system. It should be appreciated that the sheaves 32A and 32B may be axially switched without departing from the scope of the present invention.

A torque transmitting belt or chain or endless member 36 having a V-shaped cross section is mounted between the first pulley pair 30 and the second pulley pair 32. It should be appreciated that other types of belts, including positive engagement devices or non-V-shaped belts or chains, may be employed without departing from the scope of the present invention. Drive torque communicated from the transmission input shaft 20 is transferred via friction between the sheaves 30A and 30B and the belt 36. The ratio of the input pulley 30 to the output pulley 32 is adjusted by varying the spacing between the sheaves 30A and 30B and between the sheaves 32A and 32B. For example, to change the ratio between the pulleys 30 and 32, the axial distance between sheaves 30A and 30B may be reduced by moving sheave 30A towards sheave 30B while simultaneously the axial distance between sheave 32A and 32B may be increased by moving sheave 32A away from sheave 32B. Due to the V-shaped cross section of the belt 36, the belt 36 rides higher on the first pulley 30 and lower on the second pulley 32. Therefore the effective diameters of the pulleys 30 and 32 change, which in turn changes the overall gear ratio between the first pulley 30 and the second pulley 32. Since the radial distance between the pulleys 30 and 32 and the length of the belt 36 is constant, the movement of the sheaves 30A and 32A must occur simultaneously in order to maintain the proper amount of tension on the belt 36 to assure torque is transferred from the pulleys 30, 32 to the belt 36.

The pulley assembly 24 transfers torque to the gearbox 26 via the second transfer shaft 34. The gearbox 26 comprises one of several planetary gear set transmissions or arrangements, as will be described in greater detail below. The gearbox 26 outputs torque from the pulley assembly 26 to the transmission output shaft 22 and then to the final drive unit 28.

Figure 2:
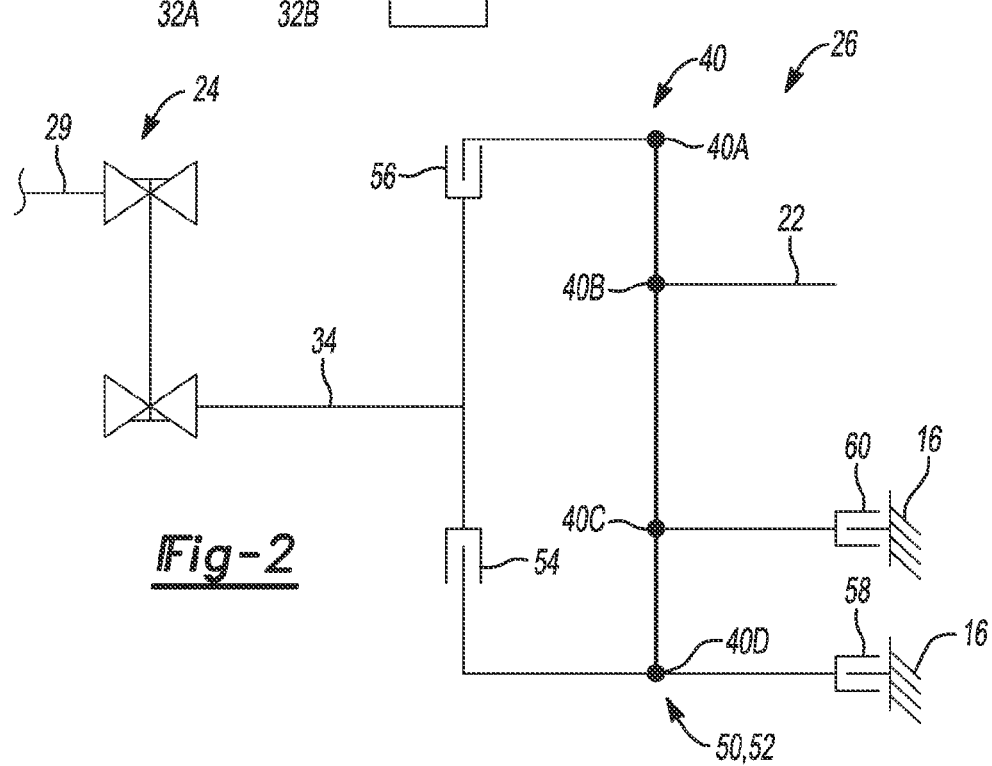
FIG. 2 is a lever diagram of an exemplary transmission according to the principles of the present invention.

Turning now to FIG. 2, the planetary gear set transmissions or arrangements of gearbox 26 is shown in lever diagram format. The gearbox 26 includes a first planetary gear set 50 and a second planetary gear set 52 arranged in a four node lever 40. The four node lever 40 includes four nodes: a first node 40A, a second node 40B, a third node 40C, and a fourth node 40D. Each of the nodes 40A, 40B, 40C, and 40D represent one or more of a sun gear member, planet carrier member, and ring gear member of the first planetary gear set 50 and the second planetary gear set 52. Where one member of the first planetary gear set 50 is directly coupled with another member of the second planetary gear set 52, those two members are represented by a single one of the nodes 40A, 40B, 40C, and 40D.

The transmission output shaft or member 22 is continuously coupled to node 40B. A first clutch 54 selectively connects the node 40D with the second transfer shaft 34. A second clutch 56 selectively connects the node 40A with the second transfer shaft 34. A first brake 58 selectively connects the node 40D with a stationary member or the transmission housing 16. A second brake 60 selectively connects the node 40C with another stationary member or the transmission housing 16.

Turning now to FIGS. 3-7 stick diagrams present schematic layouts of embodiments of the gearbox 26 according to the present invention. In FIGS. 3-7 the numbering from the lever diagram of FIG. 2 are carried over. The clutches and couplings are correspondingly presented whereas the nodes of the planetary gear sets now appear as components of planetary gear sets, such as, sun gears, ring gears, planet gears and planet gear carriers.

Figure 3:
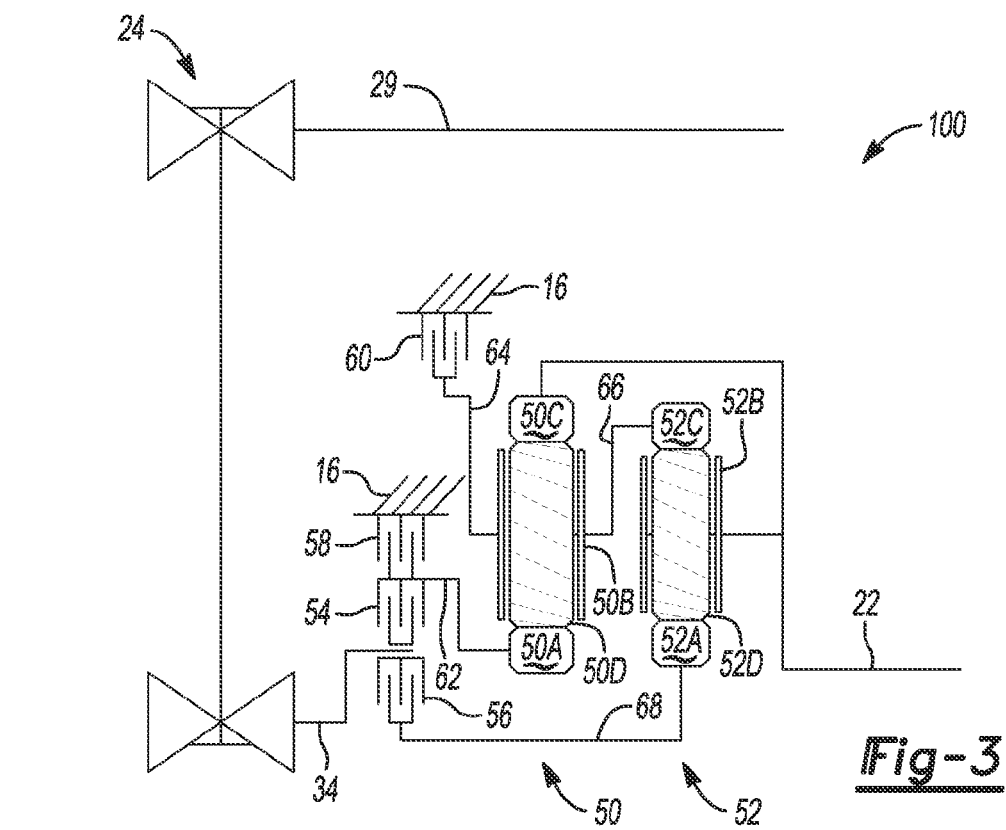
FIG. 3 is a diagrammatic illustration of another embodiment of a transmission according to the principles of the present invention.

With specific reference to FIG. 3, a transmission 100 having an example of a configuration of the gearbox 26 is illustrated. The transmission 100 includes the planetary gear set 50 and the planetary gear set 52. The planetary gear set 50 includes a sun gear member 50A, a planet carrier member 50B and a ring gear member 50C. The planet carrier member 50B rotatably supports a set of planet gears 50D (only one of which is shown). The planet gears 50D are each configured to intermesh with both the sun gear member 50A and the ring gear member 50C. The planetary gear set 52 includes a sun gear member 52A, a planet carrier member 52B and a ring gear member 52C. The planet carrier member 52B rotatably supports a set of planet gears 52D (only one of which is shown). The planet gears 52D are each configured to intermesh with both the sun gear member 52A and the ring gear member 52C. Therefore, with reference to the lever 40 in FIG. 2, in the transmission 100 the node 40A represents the sun gear member 52A, node 40B represents the ring gear member 50C and the planet carrier member 52B, node 40C represents the planet carrier member 50B and the ring gear member 52C, and node 40D represents the sun gear member 50A.

The sun gear member 50A is connected for common rotation with a first shaft or interconnecting member 62. The planet carrier member 50B is connected for common rotation with a second shaft or interconnecting member 64 and a third shaft or interconnecting member 66. The ring gear member 50C is connected for common rotation with the transmission output shaft or member 22. The sun gear member 52A is connected for common rotation with a fourth shaft or interconnecting member 68. The planet carrier member 52B is connected for common rotation with the output member or shaft 22. The ring gear member 52C is connected for common rotation with the third shaft or interconnecting member 66.

Moreover, torque-transmitting mechanisms including clutches 54 and 56 and brakes 58 and 60 are provided to allow for selective interconnection of the shafts or interconnecting members, members of the planetary gear sets and the housing. The torque-transmitting mechanisms are friction, dog or synchronizer type mechanisms or the like. For example, the first clutch 54 is selectively engageable to connect the second transfer shaft 34 with the first shaft or interconnecting member 62 and the sun gear 50A. The second clutch 56 is selectively engageable to connect the second transfer shaft 34 with the fourth shaft or interconnecting member 68 and the sun gear 52A. The first brake 58 is selectively engageable to connect the first shaft or interconnecting member 62 with the transmission housing 16 in order to restrict relative rotation of the member 62 and therefore the sun gear 50A. The second brake 60 is selectively engageable to connect the second shaft or interconnecting member 64 with the transmission housing 16 in order to restrict relative rotation of the member 64 and therefore the carrier member 50B and the ring gear 52C.

Figure 4:
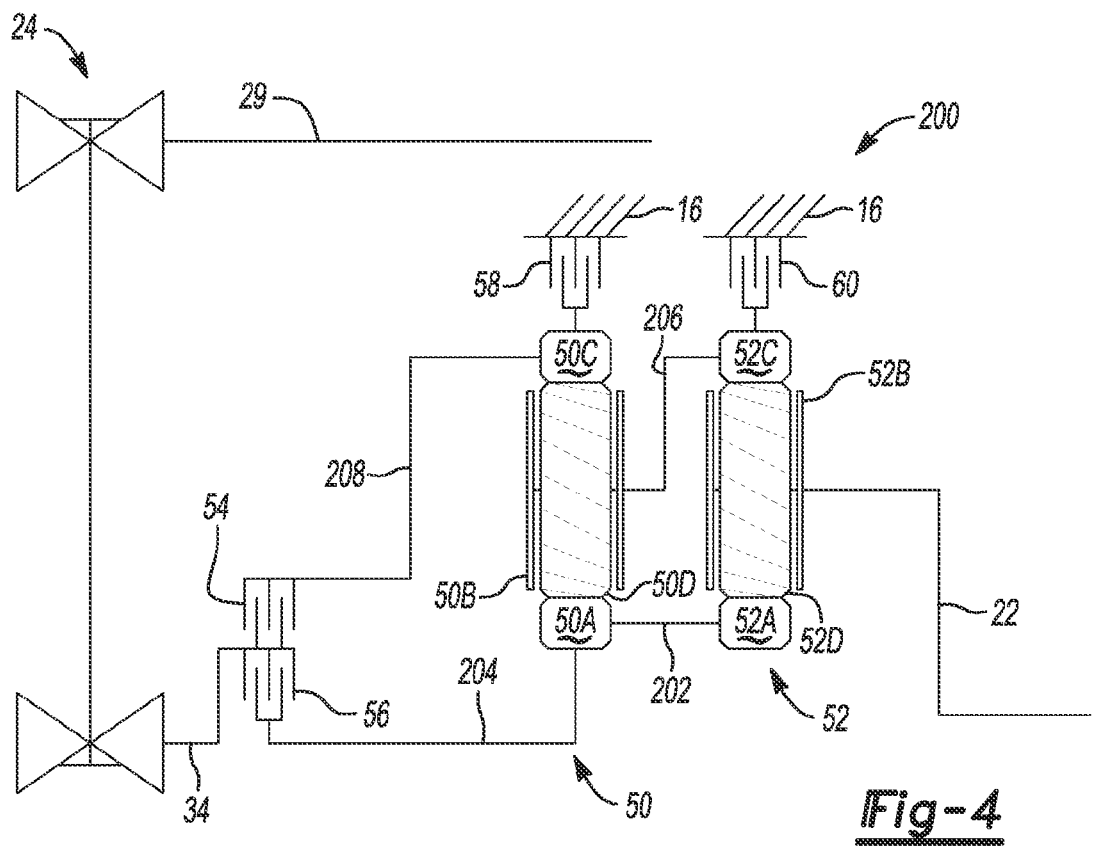
FIG. 4 is a diagrammatic illustration of yet another embodiment of a transmission according to the principles of the present invention.

With specific reference to FIG. 4, a transmission 200 having an alternate arrangement of the gearbox 26 is illustrated. The transmission 200 includes the planetary gear set 50 and the planetary gear set 52. With reference to the lever 40 in FIG. 2, in the transmission 200 the node 40A represents the sun gear member 50A and the sun gear member 52A, node 40B represents the planet carrier member 52B, node 40C represents the planet carrier member 50B and the ring gear member 52C, and node 40D represents the ring gear member 50C.

The sun gear member 50A is connected for common rotation with a first shaft or interconnecting member 202 and a second shaft or interconnecting member 204. The planet carrier member 50B is connected for common rotation with a third shaft or interconnecting member 206. The ring gear member 50C is connected for common rotation with a fourth shaft or interconnecting member 208. The sun gear member 52A is connected for common rotation with the first shaft or interconnecting member 202. The planet carrier member 52B is connected for common rotation with the output member or shaft 22. The ring gear member 52C is connected for common rotation with the third shaft or interconnecting member 206.

Moreover, torque-transmitting mechanisms including clutches 54 and 56 and brakes 58 and 60 are provided to allow for selective interconnection of the shafts or interconnecting members, members of the planetary gear sets and the housing. The torque-transmitting mechanisms are friction, dog or synchronizer type mechanisms or the like. For example, the first clutch 54 is selectively engageable to connect the second transfer shaft 34 with the fourth shaft or interconnecting member 208 and the ring gear 50C. The second clutch 56 is selectively engageable to connect the second transfer shaft 34 with the second shaft or interconnecting member 204 and the sun gears 50A and 52A. The first brake 58 is selectively engageable to connect the fourth shaft or interconnecting member 208 with the transmission housing 16 in order to restrict relative rotation of the member 208 and therefore the ring gear 50C. The second brake 60 is selectively engageable to connect the third shaft or interconnecting member 206 with the transmission housing 16 in order to restrict relative rotation of the member 206 and therefore the carrier member 50B and the ring gear 52C.

Figure 5:
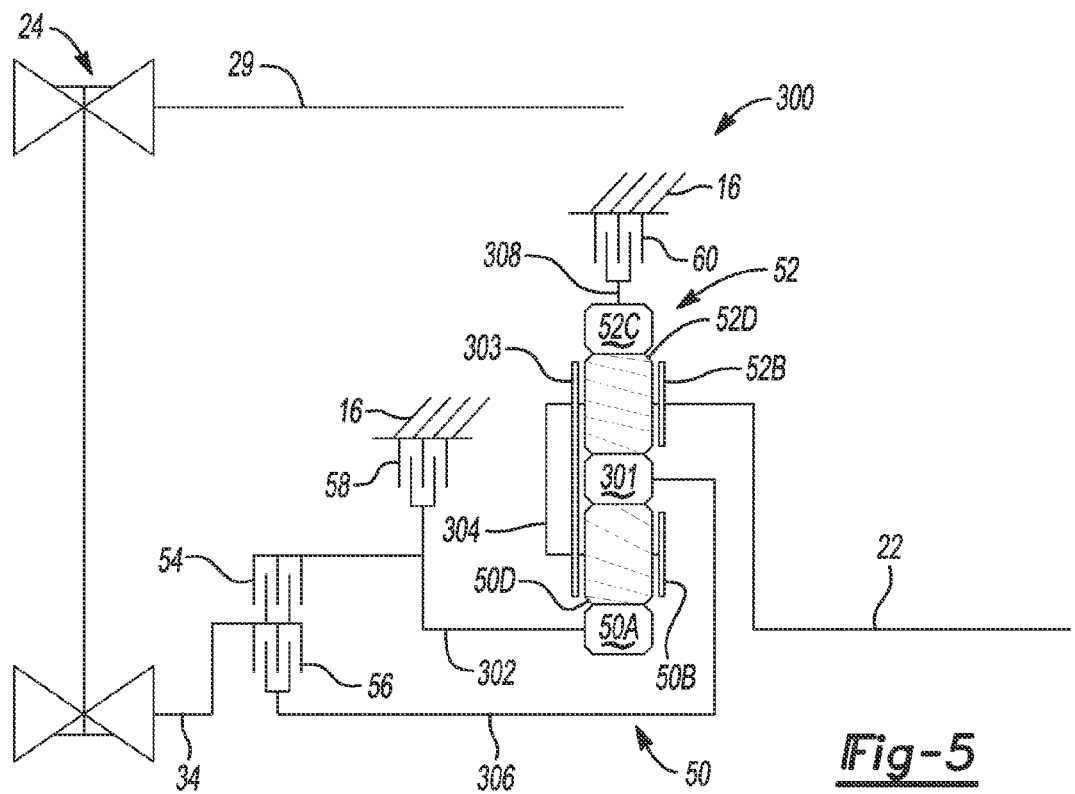
FIG. 5 is a diagrammatic illustration of still another embodiment of a transmission according to the principles of the present invention.

With specific reference to FIG. 5, a transmission 300 having an alternate arrangement of the gearbox 26 is illustrated. The transmission 300 includes the planetary gear set 50 radially stacked with the planetary gear set 52. Radially stacked herein means that the planetary gear sets 50 and 52 share a common member 301 (corresponding to the combination of ring gear 50C and sun gear 52A in FIGS. 3-4) and have planet gears 50D, 52D that are supported by a shared carrier member 303 (corresponding to the combination of planet carrier 50B and planet carrier 52B in FIGS. 3-4). The common member 301 and common planet carrier member 303 comprise two fixed connections between the first and second planetary gear sets 50 and 52. Common member 301 is a gear that has gear teeth on an inner surface and gear teeth on an outer surface of the gear. With reference to the lever 40 in FIG. 2, in the transmission 300 the node 40A represents the common member 301, node 40B represents the common planet carrier member 303, node 40C represents the ring gear member 52C, and node 40D represents the sun gear member 50A.

The sun gear member 50A is connected for common rotation with a first shaft or interconnecting member 302. The common planet carrier member 303 is connected for common rotation with a second shaft or interconnecting member 304 and the output shaft or member 22. The common member 301 is connected for common rotation with a third shaft or interconnecting member 306. The ring gear member 52C is connected for common rotation with a fourth shaft or interconnecting member 308.

Moreover, torque-transmitting mechanisms including clutches 54 and 56 and brakes 58 and 60 are provided to allow for selective interconnection of the shafts or interconnecting members, members of the planetary gear sets and the housing. The torque-transmitting mechanisms are friction, dog or synchronizer type mechanisms or the like. For example, the first clutch 54 is selectively engageable to connect the second transfer shaft 34 with the first shaft or interconnecting member 302 and the sun gear 50A. The second clutch 56 is selectively engageable to connect the second transfer shaft 34 with the third shaft or interconnecting member 306 and the common member 301. The first brake 58 is selectively engageable to connect the first shaft or interconnecting member 302 with the transmission housing 16 in order to restrict relative rotation of the member 302 and therefore the sun gear 50A. The second brake 60 is selectively engageable to connect the fourth shaft or interconnecting member 308 with the transmission housing 16 in order to restrict relative rotation of the member 308 and therefore the ring gear 52C.

Figure 6:
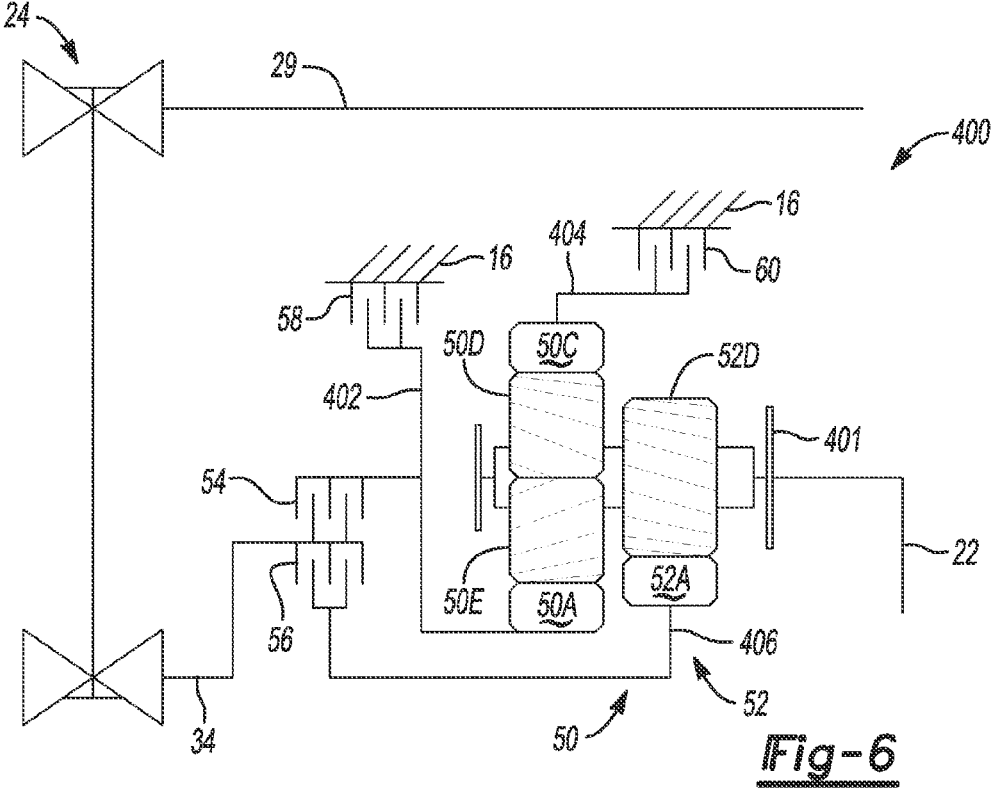
FIG. 6 is a diagrammatic illustration of still another embodiment of a transmission according to the principles of the present invention.

With specific reference to FIG. 6, a transmission 400 having an alternate arrangement of the gearbox 26 is illustrated. The transmission 400 includes a planetary gear set 50' and a planetary gear set 52'. The planetary gear set 50' includes a sun gear member 50A and a ring gear member 50C. The planetary gear set 52' includes a sun gear member 52A. The planetary gear sets 50' and 52' have a combined planet carrier member 401 that rotatably supports a first set of planet gears 50D (only one of which is shown) and a second set of planet gears 50E (only one of which is shown) associated with the first planetary gear set 50' and rotatably supports a set of planet gears 52D (only one of which is shown) associated with the second planetary gear set 52'. The planet gears 50D are each configured to intermesh with both the ring gear member 50C and the planet gears 50E. The planet gears 50E are each configured to intermesh with both the planet gears 50D and the sun gear 50A. The planet gears 52D are each configured to intermesh with the sun gear 52A. With reference to the lever 40 in FIG. 2, in the transmission 400 the node 40A represents the sun gear member 52A, node 40B represents the common carrier member 401, node 40C represents the ring gear member 50C, and node 40D represents the sun gear member 50A.

The sun gear member 50A is connected for common rotation with a first shaft or interconnecting member 402. The common planet carrier member 401 is connected for common rotation with the output shaft or member 22. The ring gear member 50C is connected for common rotation with a second shaft or interconnecting member 404. The sun gear member 52A is connected for common rotation with a third shaft or interconnecting member 406.

Moreover, torque-transmitting mechanisms including clutches 54 and 56 and brakes 58 and 60 are provided to allow for selective interconnection of the shafts or interconnecting members, members of the planetary gear sets and the housing. The torque-transmitting mechanisms are friction, dog or synchronizer type mechanisms or the like. For example, the first clutch 54 is selectively engageable to connect the second transfer shaft 34 with the first shaft or interconnecting member 402 and the sun gear 50A. The second clutch 56 is selectively engageable to connect the second transfer shaft 34 with the third shaft or interconnecting member 406 and the sun gear 52A. The first brake 58 is selectively engageable to connect the first shaft or interconnecting member 402 with the transmission housing 16 in order to restrict relative rotation of the member 402 and therefore the sun gear 50A. The second brake 60 is selectively engageable to connect the second shaft or interconnecting member 404 with the transmission housing 16 in order to restrict relative rotation of the member 404 and therefore the ring gear 50C.

Referring now to FIG. 7, a truth table presenting an example of a state of engagement of various torque transmitting elements to produce multiple forward and at least one reverse speed or gear ratios of the transmissions illustrated in FIGS. 1-6 is shown. The state of engagement of the torque transmitting elements or mechanisms (clutches 54 and 56 and brakes 58 and 60) is indicted by the presence of an "X" in the appropriate box in the table of FIG. 7. For example, a reverse gear ratio is produced by engaging the second brake 60 and the first clutch 54. Of course, an infinite number of ratios may be produced by the transmissions of the present invention through the adjustment of the pulley assembly 24, as described above, and the selection of at least two of the torque transmitting elements or mechanisms, as shown in FIG. 7. Using the above described configurations, the transmission 14 is able to achieve an overall gear ratio of approximately 14 using a pulley set with an overall gear ratio of 4. The transmission 14 also provides three different modes of operation.

The description of the invention is merely exemplary in nature and variations that do not depart from the gist of the invention are intended to be within the scope of the invention. Such variations are not to be regarded as a departure from the spirit and scope of the invention.

The invention claimed is:
1. A continuously variable transmission comprising:
an input member;
an output member;
a continuously variable unit interconnected with the input member;
a gearbox connected in series with the continuously variable unit and the output member, the gearbox comprising:
a first planetary gear set having a first member, a second member, and a third member, wherein the first planetary gear set is a simple planetary gear set;
a second planetary gear set having a first member, a second member, and a third member, wherein the second member of the first planetary gear set is continuously connected to the third member of the second planetary gear set and the third member of the first planetary gear set is continuously connected to the second member of the second planetary gear set and to the output member, wherein the second planetary gear set is a simple planetary gear set;
a first clutch continuously connected to the continuously variable unit and the first member of the first planetary gear set for selectively connecting the continuously variable unit to the first member of the first planetary gear set;
a second clutch continuously connected to the continuously variable unit and the first member of the second planetary gear set for selectively connecting the continuously variable unit to the first member of the second planetary gear set;
a first brake continuously connected to the first member of the first planetary gear set and a stationary member for selectively restricting rotation of the first member of the first planetary gear set; and
a second brake continuously connected to the second member of the first planetary gear set and the third member of the second planetary gear set and the stationary member for selectively restricting rotation of the second member of the first planetary gear set and the third member of the second planetary gear set, and
wherein the first members are sun gears, the second members are planet carrier members, and the third members are ring gears;
wherein engagement of at least two of the first clutch, second clutch, first brake, and second brake provides one of three separate modes of operation to the continuously variable transmission.

2. A continuously variable transmission comprising:
an input member;
an output member;
a continuously variable unit interconnected with the input member;
a gearbox connected in series with the continuously variable unit and the output member, the gearbox comprising:
a first planetary gear set having a first member, a second member, and a third member corresponding to one of a sun gear, a carrier member, and a ring gear, wherein the first planetary gear set is a simple planetary gear set;
a second planetary gear set having a first member, a second member, and a third member corresponding to one of a sun gear, a carrier member, and a ring gear, wherein the second planetary gear set is a simple planetary gear set;
a first interconnecting member directly connected to the ring gear of the first planetary gear set and the carrier member of the second planetary gear set and to the output member;
a second interconnecting member directly connected to the planet member of the first planetary gear set and the ring gear of the second planetary gear set;
a third interconnecting member directly connected to the sun gear of the first planetary gear set;

a fourth interconnecting member directly connected to the sun gear of the second planetary gear set;

a fifth interconnecting member directly connected to the carrier member of the first planetary gear set;

a first clutch directly connected to the continuously variable unit via a transfer shaft and the first planetary gear set via the third interconnecting member;

a second clutch directly connected to the continuously variable unit via the transfer shaft and the second planetary gear set via the fourth interconnecting member;

a first brake directly connected to the first planetary gear set via the third interconnecting member and to a stationary member; and a second brake directly connected to the first planetary gear set via the fifth interconnecting member and to the stationary member, and wherein engagement of at least two of the first clutch, second clutch, first brake, and second brake provides one of three separate modes of operation to the continuously variable transmission.

3. The continuously variable transmission of claim 2 further comprising a speed change device continuously connected to the input member.

4. The continuously variable transmission of claim 3 wherein the speed change device includes a first coplanar gear meshed with a second coplanar gear, wherein the second coplanar gear is continuously connected with the input member.

5. The continuously variable transmission of claim 4 wherein the speed change device is an overdrive speed change device.

6. The continuously variable transmission of claim 4 wherein the speed change device is an underdrive speed change device.

7. The continuously variable transmission of claim 2 wherein the continuously variable transmission provides an overall gear ratio between the input member and the output member of approximately 14 while the continuously variable unit provides a gear ratio of approximately 4 between the input member and the transfer shaft.

* * * * *